United States Patent
Shanks

(10) Patent No.: US 8,836,512 B2
(45) Date of Patent: Sep. 16, 2014

(54) SELF TUNING RFID

(75) Inventor: Wayne E. Shanks, Pasadena, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 1242 days.

(21) Appl. No.: 12/181,067

(22) Filed: Jul. 28, 2008

(65) Prior Publication Data

US 2010/0019907 A1 Jan. 28, 2010

(51) Int. Cl.
*G08B 13/14* (2006.01)
*G06K 19/077* (2006.01)
*G06K 19/07* (2006.01)
*G06K 7/00* (2006.01)

(52) U.S. Cl.
CPC ...... *G06K 19/07749* (2013.01); *G06K 19/0713* (2013.01); *G06K 7/0008* (2013.01)
USPC ........................................ 340/572.5; 327/536

(58) Field of Classification Search
USPC ................... 340/572.1–572.9, 10.1; 327/536; 343/820–822, 860; 455/191.1, 191.3, 455/193.1, 193.2
See application file for complete search history.

(56) References Cited

U.S. PATENT DOCUMENTS

| | | | |
|---|---|---|---|
| 6,734,797 B2 | 5/2004 | Shanks et al. | |
| 7,167,090 B1 * | 1/2007 | Mandal et al. | 340/538.14 |
| 7,180,403 B2 * | 2/2007 | Quan | 340/10.3 |
| 7,339,481 B2 * | 3/2008 | Duron | 340/572.7 |
| 7,439,860 B2 * | 10/2008 | Andresky | 340/572.1 |
| 7,595,732 B2 * | 9/2009 | Shameli et al. | 340/572.5 |
| 7,944,279 B1 * | 5/2011 | El Waffaoui | 327/536 |
| 8,687,395 B2 * | 4/2014 | El Waffaoui | 363/127 |
| 2002/0149416 A1 * | 10/2002 | Bandy et al. | 327/536 |
| 2002/0149482 A1 | 10/2002 | Shanks | |
| 2003/0006901 A1 * | 1/2003 | Kim et al. | 340/572.5 |
| 2006/0094425 A1 * | 5/2006 | Mickle et al. | 455/434 |
| 2006/0286938 A1 * | 12/2006 | Murdoch | 455/73 |
| 2007/0087719 A1 * | 4/2007 | Mandal et al. | 455/299 |
| 2007/0103311 A1 | 5/2007 | Kippelen | |
| 2007/0153561 A1 * | 7/2007 | Mickle et al. | 363/170 |
| 2007/0222605 A1 * | 9/2007 | Andresky | 340/572.7 |
| 2007/0236851 A1 * | 10/2007 | Shameli et al. | 361/113 |
| 2008/0012650 A1 * | 1/2008 | Shinbo et al. | 331/17 |
| 2008/0106418 A1 | 5/2008 | Sloan | |
| 2008/0212346 A1 * | 9/2008 | Rizzo et al. | 363/60 |
| 2010/0019907 A1 * | 1/2010 | Shanks | 340/572.5 |

OTHER PUBLICATIONS

International Search Report Dated Oct. 2, 2009.
International Preliminary Report on Patentability and Written Opinion for International Patent Application No. PCT/US2009/050940 issued on Feb. 1, 2011.

* cited by examiner

*Primary Examiner* — Brian Zimmerman
*Assistant Examiner* — An T Nguyen

(57) ABSTRACT

The antenna of an RFID tag is automatically tuned by controlling both the real and imaginary components impedance "seen" by the antenna. The real component (resistive) is controlled by controlling a tap of a charge pump circuit of the tag. The imaginary (reactive) component is controlled by connecting one or more reactive elements of an antenna tuning circuit to the antenna. The real component is controlled by a first digital control loop that automatically activates successive taps on a charge pump of the RFID tag which effectively controls the resistance seen by the antenna. A second digital control loop controls the connection of the various reactive components.

15 Claims, 8 Drawing Sheets

US 8,836,512 B2

SELF TUNING RFID

BACKGROUND

1. Field of Invention

The invention relates in general to the use of radio frequency identification (RFID) tags and RFID tag readers (also known as "interrogators"). In particular, the invention relates to the configuration and operation of RFID tags that can self tune an integrated antenna so as to automatically adjust to a resonant frequency.

2. Related Art

Radio frequency identification (RFID) tags are electronic devices that may be affixed to items whose presence is to be detected and/or monitored. RFID tags are classified based on standards defined by national and international standards bodies (e.g., EPCGlobal and ISO). Standard tag classes include Class 0, Class 1, and Class 1 Generation 2 (referred to herein as "Gen 2"). The presence of an RFID tag, and therefore the presence of the item to which the tag is affixed, may be checked and monitored wirelessly by an "RFID reader", also known as a "reader-interrogator", "interrogator", or simply "reader." Readers typically have one or more antennas for transmitting radio frequency signals to RFID tags and receiving responses from them. An RFID tag within range of a reader-transmitted signal responds with a signal including a unique identifier.

With the maturation of RFID technology, efficient communication between tags and readers has become a key enabler in supply chain management, especially in manufacturing, shipping, and retail industries, as well as in building security installations, healthcare facilities, libraries, airports, warehouses etc.

RFID tags are small. Integrating an antenna into a RFID tag is difficult at best. Design compromises necessary for available space result in antenna arrangements that are sub-optimal. They do not have a good low VSWR characteristic across their intended band of operation. When size and space are not issues, an antenna can be matched by loading it with reactive elements that may be tunable in order to compensate for a sub-optimal antenna. By properly selecting the size and placement of reactive elements, an antenna can be made to appear full size and have a low VSWR at an operating frequency. Such antenna compensation becomes more difficult when there is little space to work with.

The problem of antenna compensation becomes even more difficult in an RFID tag environment. An RFID tag antenna receives interrogation signals from an RFID interrogator (also known as a "reader"). A typical passive RFID tag responds by backscattering part of the received signal by controlling its antenna to do so. Power for the RFID tag is obtained by allowing part of the energy received by the RFID tag antenna to feed a charge pump connected to the antenna. The process of pumping charge from the antenna affects its impedance and thus the characteristics of the antenna.

SUMMARY

This summary is for the purpose of summarizing some aspects of the inventions described more fully in other sections of this patent document. It briefly introduces some preferred embodiments. Simplifications or omissions may be made to avoid obscuring the purpose of the section. Such simplifications or omissions are not intended to limit the scope of the claimed inventions. The inventions can be implemented in numerous ways, including methods, systems, devices, and computer readable medium. Several embodiments of the inventions are discussed below, but they are not the only ways to practice the inventions described herein.

The invention provides an RFID tag arrangement that is self tuning. The RFID tag is powered by a charge pump having multiple stages, each having a tap so that the number of stages used can be selected. The antenna of the RFID tag is connected to transmitter and receiver circuits through a switchable impedance matching circuit. A tuning circuit includes first and second digital control loops. The first digital control loop causes the RFID tag to cycle through successive taps of the charge pump circuit until a maximum voltage tap has been reached. The maximum voltage occurs when the charge pump resistance matches the real component of antenna impedance. By finding the right tap on the charge pump, the real component of antenna impedance is matched. A second digital control loop controls connection of components of the impedance matching circuit coupled to the antenna. Means are provided for updating the second digital control loop by the first digital control loop.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Exemplary Operating Environment

Figure 1:
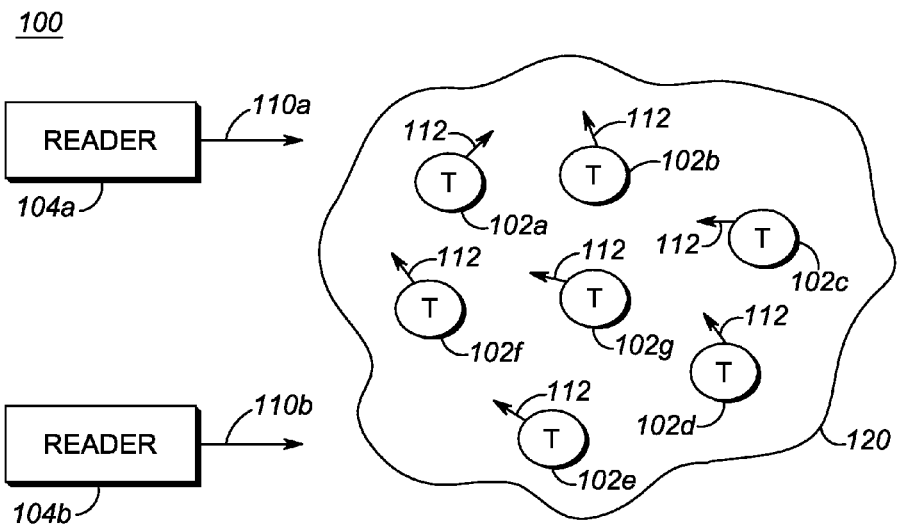
FIG. 1 illustrates an environment in which RFID tag readers communicate with a population of RFID tags.

Before describing embodiments of the inventions in detail, it may be helpful to understand an example RFID communications environment in which the inventions may be implemented. FIG. 1 illustrates an environment 100 where RFID tag readers 104 (readers 104a and 104b shown in FIG. 1) communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network (see FIG. 2). A reader 104 may be continuously commercial powered by attachment to power mains or it may be battery powered. The inventions described herein are particularly applicable to batter powered readers.

As shown in FIG. 1, reader 104a "reads" tags 120 by transmitting an interrogation signal 110a to the population of tags 120. Interrogation signals may have primary signal at a particular carrier frequency or may comprise a plurality of signals transmitted in a frequency hopping arrangement or some other configuration.

Readers 104a and 104b typically operate in one or more of the frequency bands allotted for this type of RF communication. For example, the Federal Communication Commission (FCC) defined frequency bands of 902-928 MHz and 2400-2483.5 MHz for certain RFID applications.

Tag population 120 may include tags 102 of various types, such as, for example, various classes of tags as enumerated above. Thus, in response to interrogation signals, the various tags 102 may transmit one or more response signals 112 to an interrogating reader 104. Tags of one type, for example, respond by alternatively reflecting and absorbing portions of signal 104 according to a time-based pattern. This technique for alternatively absorbing and reflecting signal 104 is referred to as "backscatter modulation." Backscatter modulation may include one or more alpha-numeric characters that uniquely identify a particular tag (and therefore an object to which the tag may be affixed). Readers 104a and 104b receive data from response signals 112, such as an identification number of the responding tag 102. In embodiments described herein, a reader may be capable of communicating with tags 102 according to various suitable communication protocols, including Class 0, Class 1, EPC Gen 2, other binary traversal protocols and slotted aloha protocols, and any other protocols mentioned elsewhere herein. They may be adapted to support communication protocols to be created in the future. Tag population 120 may include one or more tags having a packed object format described herein and/or one or more tags not using the packed object format, such as, for example, standard ISO tags.

Figure 2:
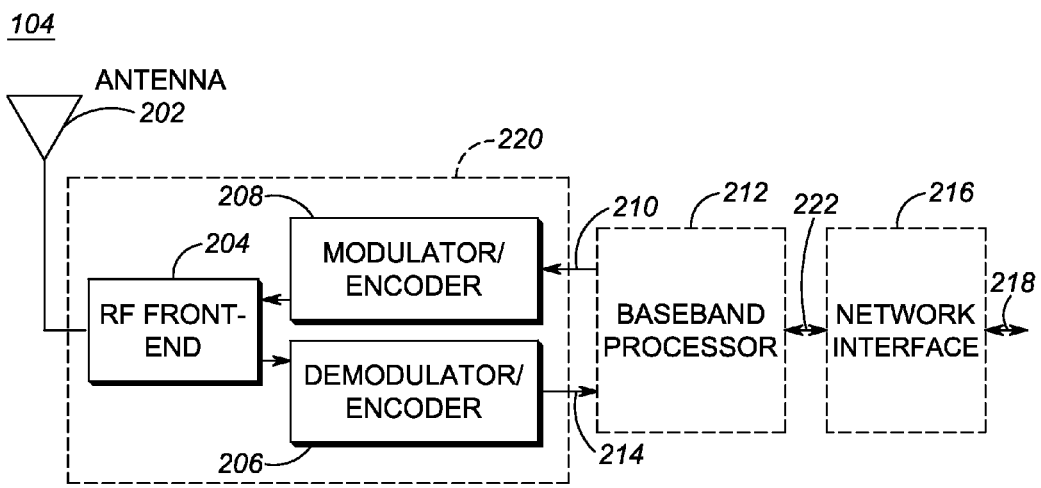
FIG. 2 is a block diagram of an example RFID reader.

FIG. 2 is a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions. If RFID reader 104 is battery powered, it will also contain a battery.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. Baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including for example and without limitation, a vertical, dipole, loop, Yagi-Uda, slot, and patch antenna type.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a Bluetooth link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as, for example, one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
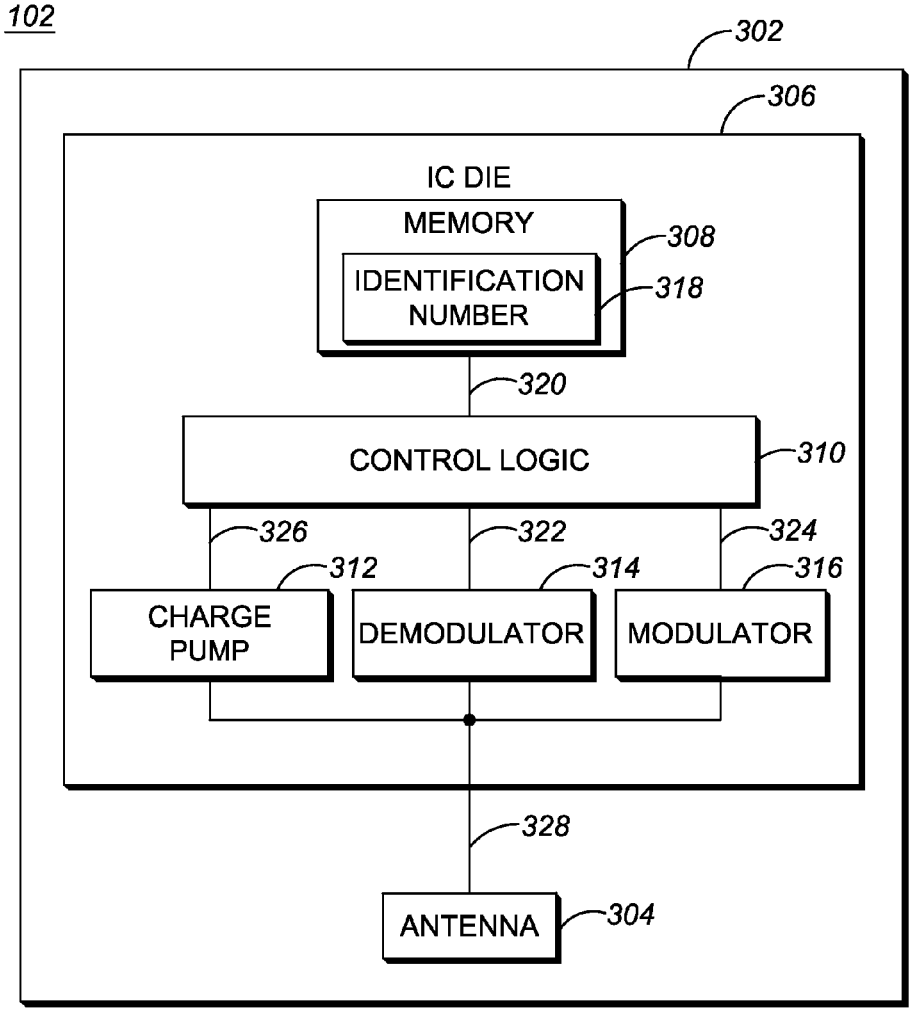
FIG. 3 is a schematic block diagram of an example radio frequency identification (RFID) tag.

The inventions described herein are applicable to any type of RFID tag and RFID reader system. FIG. 3 is a schematic block diagram of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including for example dipole, loop, slot, and patch. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. Inputs of charge pump 312, and demodulator 314, and an output of modulator 316 are coupled to antenna 304 by antenna signal 328.

Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on an input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112 (see FIG. 1), which is received by reader 104. In one example embodiment, modulator 316 includes a switch, such as a single pole, single throw (SPST) switch. The switch is configured in such a manner as to change the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 powers circuits of IC die 306, including control logic 310.

Charge pump 312 rectifies a portion of the power of the radio frequency communication signal of antenna signal 328 to create a voltage power. Charge pump 312 increases the voltage level of the rectified power to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by battery).

Memory 308 is typically a non-volatile memory, but can alternatively be a volatile memory, such as a DRAM. Memory 308 stores data, including an identification number 318. In a Gen-2 tag, tag memory 308 may be logically separated into four memory banks.

Self Tuning

Figure 4:
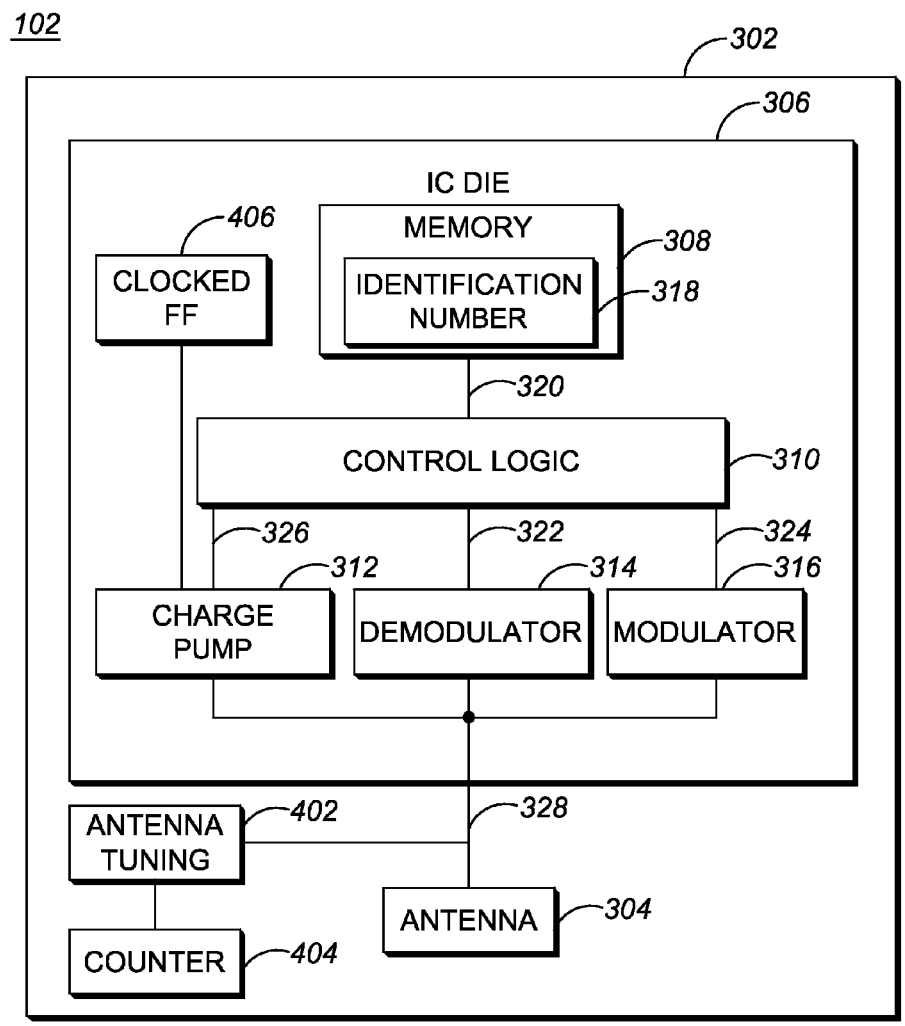
FIG. 4 is a block diagram showing major components of a self tuning arrangement according to the inventions.

FIG. 4 is a schematic block diagram of an RFID Tag 102 that is generally similar to the RFID Tag shown in FIG. 3. However, additional functional blocks are added which enable features of the invention. The FIG. 4 embodiment is different from the FIG. 3 embodiment in that it includes an antenna tuning circuit 402 controlled at least in part by an antenna tuning circuit counter 404. It also includes a clocked flip flop control module 406 for controlling the stages of Charge Pump 312. Clocked flip flop control module 406 controls which tap of charge pump 312 is connected and utilized. The clocked flip flop control module is explained in greater detail in FIG. 8. Charge pump 312 is controlled in such a manner as to match a real (resistive) component of an impedance associated with antenna 304. Antenna tuning circuit 402 is provided to match the imaginary (reactive) component of the impedance associated with antenna 304. As will be explained further, antenna tuning circuit 402 includes a bank of reactive elements, such as capacitors that can be "banked in" i.e. connected to antenna 304 under the control of counter 404.

Figure 5:
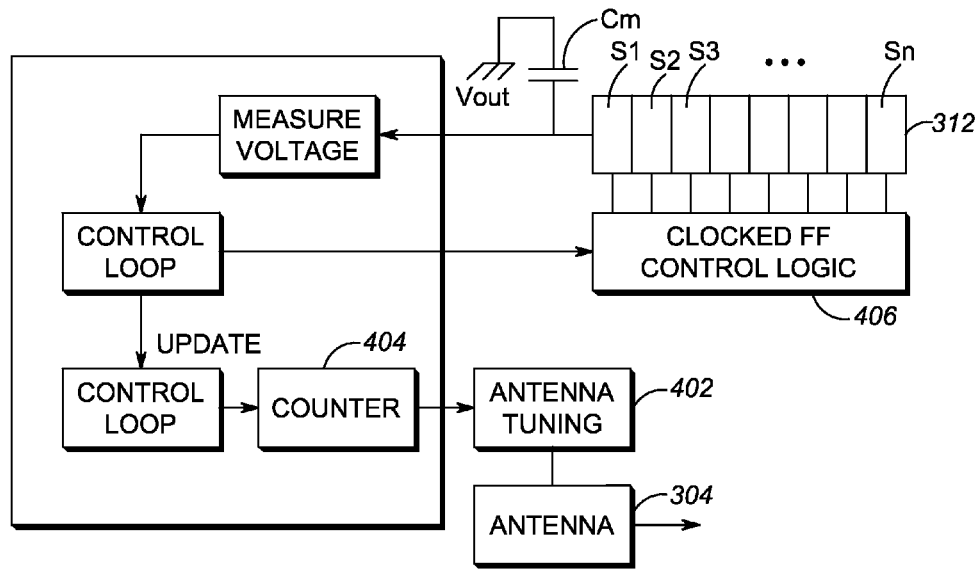
FIG. 5 is a high level schematic diagram of key elements of the invention in their relation with basic elements of a standard RFID tag.

FIG. 5 is a schematic diagram explaining in greater detail how charge pump 312 is controlled and how antenna tuning circuit 402 is controlled. Charge pump 312 has a plurality of stages $S_1 \ldots S_N$, each having a "tap" to which a circuit connection can be made. The real (resistive) component of impedance "seen" by antenna 304 is at least in part a function of how many stages $S_1 \ldots S_N$ of charge pump 312 are connected, or "activated". A sufficient match of antenna 304 is considered to have been achieved when a measured voltage $V_{out}$ of charge pump 312 is greater than or equal to a predetermined threshold Voltage $V_{TH}$. The stages of clocked flip flop 406 are connected to respective stages $S_1 \ldots S_N$ of charge pump 312 such that the state of clocked flip flop 405 controls which stages of charge pump 312 are connected and activated at any time. Thus, by controlling the state of clocked flip flop 405, the resistive component of impedance "seen" by antenna 304 is controlled.

Figure 6:
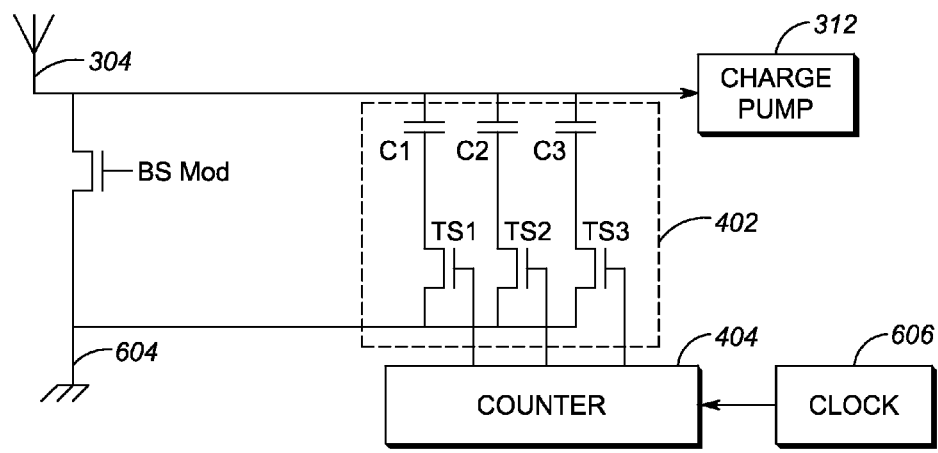
FIG. 6 is a schematic diagram showing details of tuning circuit 402.
Figure 7:
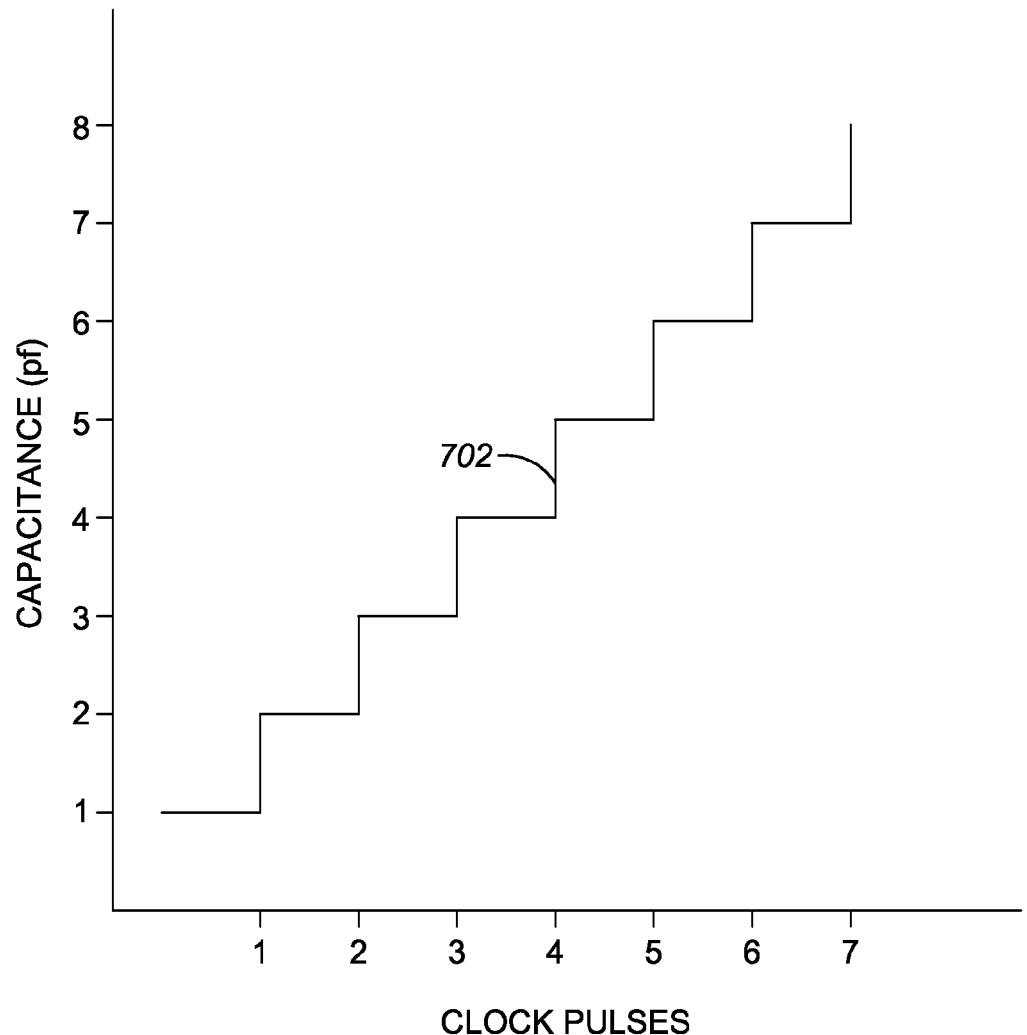
FIG. 7 is a graphical representation showing how the antenna tuning circuit provides different capacitance amounts as controlled by the outer loop.

FIG. 6 is a schematic diagram showing how antenna tuning circuit 402 is configured and controlled. Antenna tuning circuit 402 includes a bank of reactive components. In this embodiment the reactive components are capacitors $C_1$, $C_2$ and $C_3$ which can be "banked in" selectively by controlling transistor switches $TS_1$, $TS_2$ and $TS_3$. In this embodiment, for convenience of explanation, only three capacitors $C_1$, $C_2$ and $C_3$ and respective transistor switches $TS_1$, $TS_2$ and $TS_3$ are shown. Fewer or more capacitors can be used, as needed for particular RFID tags. Thus, it is contemplated that antenna tuning circuit 402 can include fewer or more than three elements and that those elements can include inductive elements as well as capacitive elements. Based on the configurations of currently popular RFID tags, the antenna tuning circuit will usually include capacitive elements rather than inductive elements. Transistor switches $TS_1$, $TS_2$ and $TS_3$ are controlled by respective stages of antenna tuning circuit counter 404. The values of Capacitors $C_1$, $C_2$ and $C_3$ are selected such that they have a "digital" relationship to one another. As an example, capacitors may be assigned values such as: $C_1=1$ pf, $C_2=2$ pf, $C_3=4$ pf, and so on if there are more than three capacitors. The capacitors are "banked in" by clocking counter 404 which controls switches $TS_1$, $TS_2$ and $TS_3$. Under the control of counter 404, one can connected one or more capacitors in circuit in any combination so as to be able to control the total capacitance in steps such as, for example, 1 pf., 2 pf., 3 pf., 4 pf., 5 pf., 6 pf., 7 pf., and 8 pf., as shown in FIG. 7. Counter 404 is clocked by a clock 606.

FIG. 7 is a graphical representation showing how various levels of capacitance can be achieved by controlling antenna tuning circuit 402 by clocking counter 404 using clock 606. By clocking counter 404, the capacitors of antenna tuning circuit 402 can be connected step by step in combination to achieve a stair-step increase in capacitance from 1-8 pf. as shown in the figure. For example a given clock pulse may connect only capacitor $C_1$, the next clock pulse may connect only capacitor $C_2$, and the next pulse may connect both capacitors. Thus, if the values and connections of capacitors are selected with foresight, a stepwise program of capacitor values being "banked in" can be achieved as shown in FIG. 7.

Figure 8:
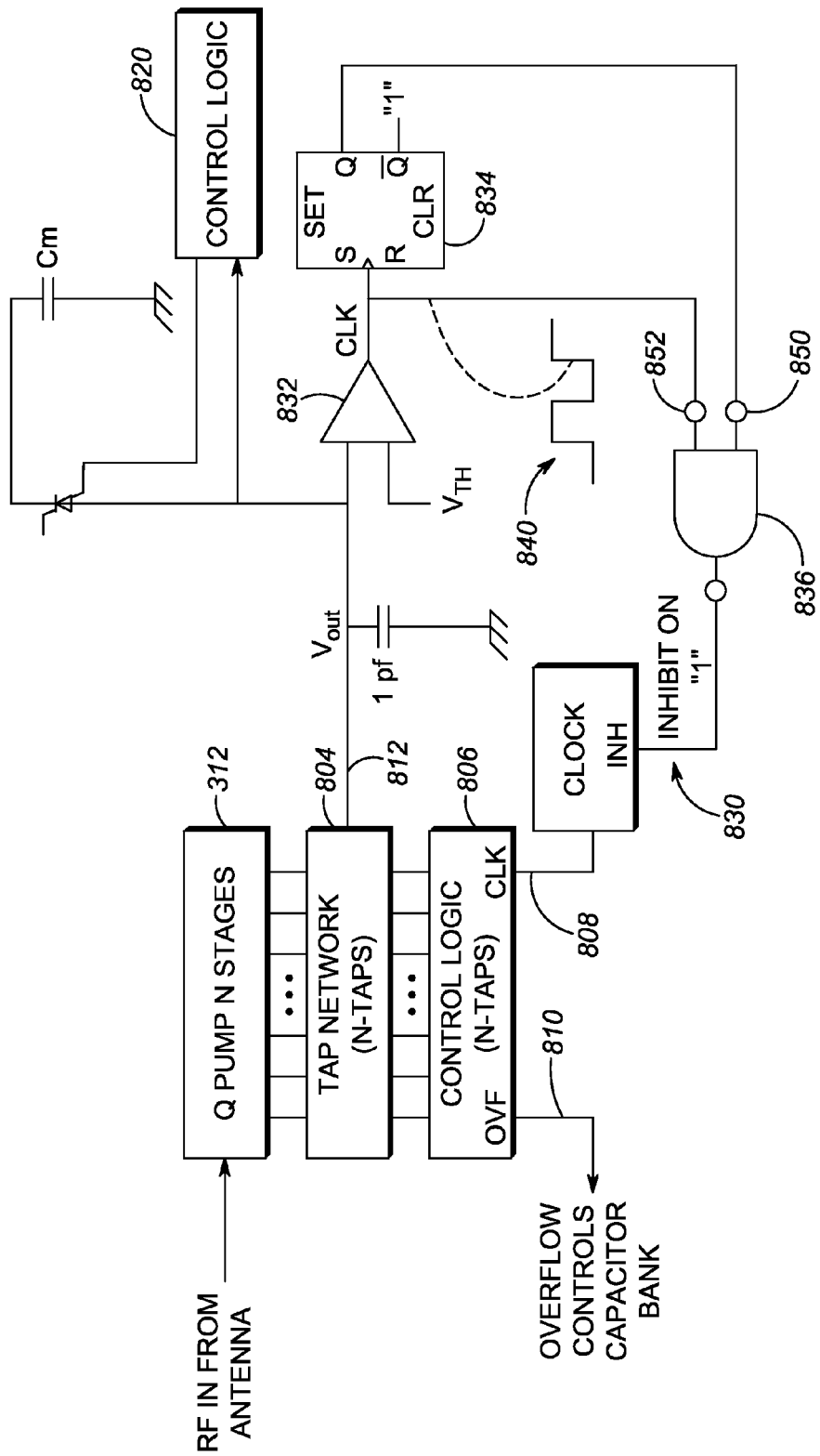
FIG. 8 is a detailed schematic diagram of flip flop control module 406 shown in FIG. 4.

FIG. 8 is a detailed schematic diagram of flip flop control module 406 shown in FIG. 4. In this embodiment, charge pump 312 is shown as having N stages. The N stages are coupled to respective taps of a tap network 804. Tap network 804 is controlled by control logic 806 which has a clock input 808 and an overflow output 810. The output Vo of charge pump 312 is taken at a node 812 of tap network 804. Vo is smoothed by a capacitor 814. In this embodiment capacitor 814 has a value of 1 pf. However, this value is only exemplary. The value of output voltage Vo controls the "banking in" of the RFID tag's main capacitor Cm. This control is carried out by control logic 820 which controls a thyristor element 816 in series with main capacitor Cm. In this embodiment the main capacitor Cm has a value of 700 pf and is banked in using a thyristor element 816. The taps of tap network 804 are controlled by a digital control loop 830 including a comparator 832, a clocked flip flop 834, a NAND gate 836 and a clock 838. Output voltage Vo generated by charge pump 312 is compared with a predetermined threshold voltage Vth by comparator 832. The output of comparator 832 is used to clock flip flop 834. Clocking occurs on the rising edge of the clock signal as shown by waveform 840. Clocked flip flop 834 has its Qbar input forced to "1". The Q output of clocked flip flop 834 is coupled to an input 850 of NAND gate 836. A second input 852 of NAND gate 836 is clocked by the output of comparator 832. Using this digital control loop 830, the taps of charge pump 312 are advanced from one to the next until all taps are being used. On the next clock pulse thereafter, an overflow signal is generated at overflow 810 of control logic 806. This overflow signal is used to control the banking in of capacitors of tuning circuit 402. The control of taps of charge pump 312 and the banking in of capacitors of tuning circuit 402 is explained further with respect to FIG. 9.

Figure 9:
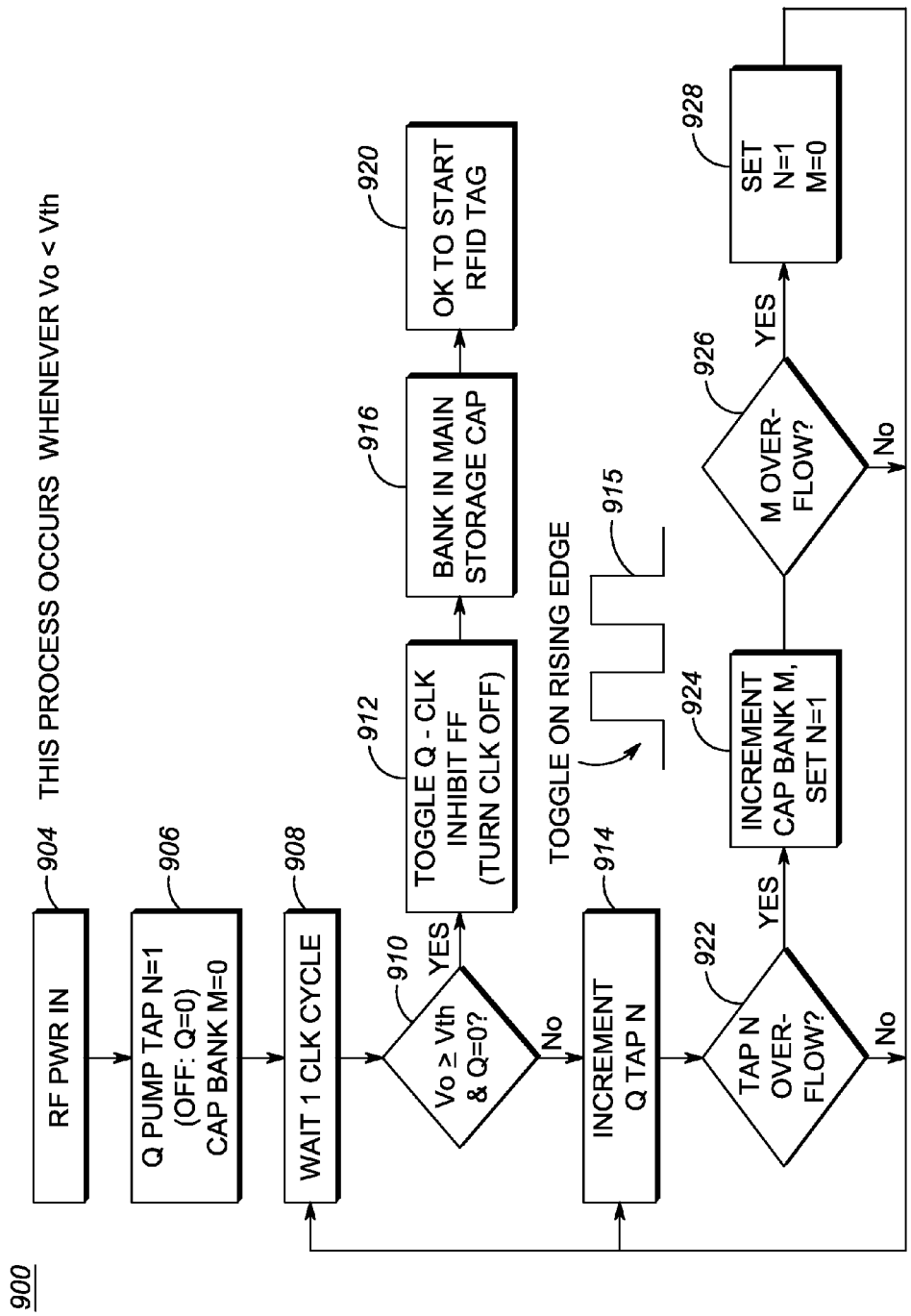
FIG. 9 is a flow chart explaining the operation of the self tuning arrangement according to the inventions.

FIG. 9 is a flowchart explaining a process 900 of self tuning for a relatively simple embodiment of a self tuning RFID tag according to the invention. Process 900 occurs whenever Vo<Vth. When Vo<Vth it is desirable to self-tune the RFID tag in order to maximize a voltage that can be produced to power the RFID tag from incoming RF received by the tag. RF power is received by RFID Tag 102 at step 904.

At step 906 the Q Pump tap is initialized to N=1 (the Q Pump is completely off when N=0). The capacitor bank is initialized to M=0. At step 908 there is a wait of one clock cycle. After one clock cycle, control passes to step 910.

At step 910 it is tested whether or not Vo≥Vth and Q=0. If Vo≥Vth and Q=0, control passes to step 912. However, if either Vo≥Vth or Q=0 is not true, control passes to step 914.

At step 912, since both tests of step 910 were passed, there is sufficient voltage being generated by the Q Pump to operate the RFID tag. It must be sufficiently tuned. The Q clock inhibit flip flop is toggled to turn off the clock and control passes to step 916. This toggle occurs on a rising edge of the clock as indicated by arrow 913 and waveform 915. At step 916, the main storage capacitor Cm is "banked in" and the RFID tag begins operating at step 920. However, as stated above, if both tests of step 910 are not passed, control passes to step 914. At step 914, the tap of charge pump 312 is incremented, i.e. if N=2 before step 914, it is incremented to N=3, etc. After the tap of charge pump 312 is incremented at 914, control passes to step 922. At 922 it is determined whether or not there is a charge pump 312 tap overflow condition, i.e. the last tap was already in use prior to an attempt to increment the tap at 914. If a tap overflow condition is detected at 922, control passes to step 924. If no tap overflow condition exists, control passes to step 908.

At step 924, the capacitor bank is incremented to the next higher level of total capacitance. When the capacitor bank is incremented, the charge pump tap is reset to N=1. In this manner by cycling through the various values of capacitance for a given charge pump tap and then incrementing the charge pump, the RFID tag can work its way through the various possible combinations of capacitance and charge pump tap, all the while testing to see if sufficient voltage is being generated to operate the RFID tag. After the capacitor bank has been incremented and the charge pump tap reset at 924, control passes to step 926.

At step 926 it is determined whether the possible combinations of capacitors has reached its limit and "overflowed". If the capacitor bank has overflowed, control passes to step 928. If the capacitor bank has not overflowed, control passes to step 908. At step 928 (after a capacitor bank overflow), the charge pump tap is reset to N=1 and the capacitor bank is reset to M=0.

Figure 10:
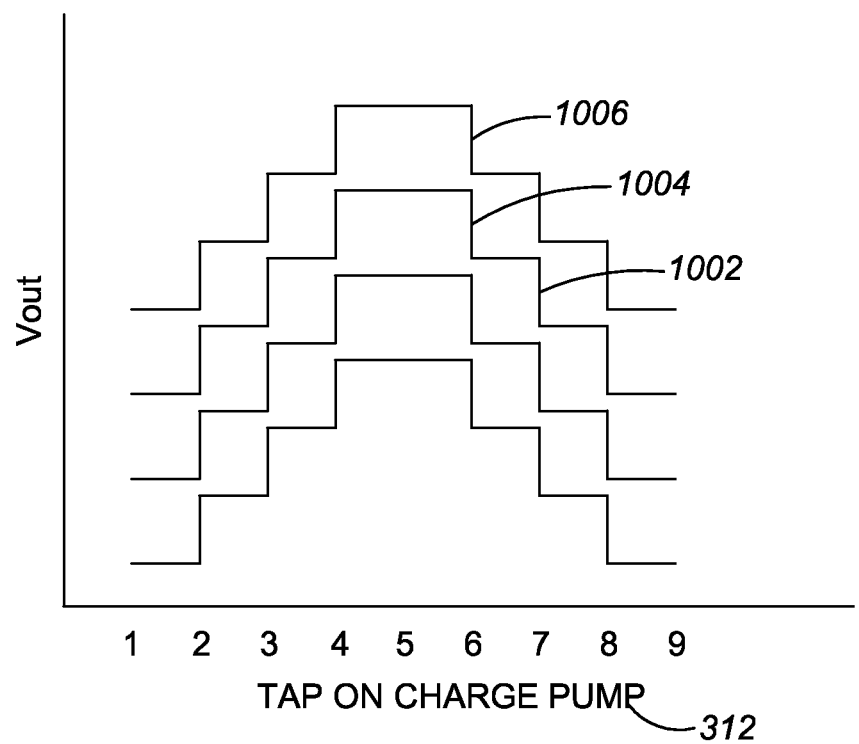
FIG. 10 is a graphical representation showing how taps on the charge pump and capacitance of the tuning circuit work together to self-tune the RFID tag.

FIG. 10 graphically represents the actions occurring as a result of process 900 described with respect to FIG. 9. As shown in FIG. 10, there are three stair-step plots 1002, 1004, and 1006 representing various voltages Vo that are achieved by various combinations of charge pump tap and capacitors of antenna tuning circuit that are connected. For a given plot, each capacitance of antenna tuning circuit 402 is represented by one stair-step plot. For example plot 1002 may represent 4 pf of capacitance of antenna tuning circuit 402 and plot 1004 may represent 5 pf of capacitance of antenna tuning circuit 402. A complete family of plots (not all plots are shown for the sake of simplicity of explanation) would represent all possible combinations of charge pump taps N with all possible capacitances M that can be achieved by banking in the capacitors of antenna tuning circuit 402. By manipulating the various combinations of charge pump tap and the amount of total capacitance, it is possible to move on a particular plot and to jump from plot to plot (as capacitors are banked in) in order to optimize a voltage Vout and thereby achieve the maximum possible voltage for a given hardware arrangement and RF field strength condition. When Vo above a desired threshold is achieved during process 900, the process stops and the RFID tag operates.

CONCLUSION

The above examples of a system and method for extending battery life by minimizing duty cycle of a battery-powered RFID tag reader during time periods when it is not likely to get a "read."

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An RFID tag having self tuning, comprising:
   a charge pump having multiple taps;
   an antenna;
   an antenna impedance matching circuit coupled to the antenna and including a plurality of reactive components that are selectively connectable to the antenna;
   a first digital control loop configured to cause the RFID tag to cycle through successive taps of the charge pump to control a resistive impedance match for the antenna and a charge pump output voltage;
   a second digital control loop configured to increase the charge pump output voltage by controlling connection of the reactive components to the antenna and a reactive impedance match for the antenna; and
   an indicator to the second digital control loop indicating a status of the first digital control loop cycle, wherein the reactive components of the antenna impedance matching circuit are connected to the antenna in response to the indication.

2. An RFID tag according to claim 1 wherein the first digital control loop configured to cause the RFID tag to cycle through successive taps of the charge pump until one or more of a maximum voltage is met and a predetermined voltage threshold is equaled or exceeded.

3. An RFID tag according to claim 1 wherein the reactive components are capacitors.

4. An RFID tag according to claim 1 wherein the reactive components are inductors.

5. An RFID tag according to claim 1 further comprising:
   an RFID tag main storage capacitor configured to collect and store power from the charge pump and provide power to the RFID tag for its operation; and
   the main storage capacitor is connected in circuit when a predetermined criteria has been met.

6. An RFID tag according to claim 5 wherein the predetermined criteria is a voltage exceeding a predetermined level.

7. A method of operating an RFID tag so that it self-tunes, the RFID tag including a charge pump having multiple taps, an antenna, an antenna impedance matching circuit including a plurality of reactive components selectively connectable to the antenna, a first digital control loop configured to cause the RFID tag to cycle through successive charge pump taps to produce a charge pump output voltage, a second digital control loop configured to control connection of the reactive components to the antenna, and an indicator to the second digital control loop indicating a status of the first digital control loop cycle, the method comprising:
   (a) receiving power at the antenna;
   (b) initializing the antenna impedance matching circuit to a first level of reactance;
   (c) initializing a charge pump to provide a first level of resistive impedance match for the antenna and operate at a first tap;
   (d) determining whether a charge pump output voltage is greater than a predetermined threshold voltage;
   (e) if at step (d) the charge pump output voltage is greater than the predetermined threshold, banking in a main capacitor of the RFID tag and operating the RFID tag in a normal operation mode; and
   (f) if at step (d) the charge pump output voltage is not greater than the predetermined threshold then, using said digital loops,
   cycling through one or more taps of the charge pump to provide successive levels of resistive impedance match for the antenna, and
   based on the cycling through the one or more taps of the charge pump, connecting the reactive components of the antenna impedance matching circuit to adjust a reactive impedance match for the antenna and increase the charge pump output voltage.

8. An RFID tag according to claim 1 wherein the second digital control loop is configured to control connection of the reactive components of the antenna impedance matching circuit to improve a match of an impedance of the antenna.

9. An RFID tag according to claim 8 wherein the second digital control loop is configured to control connection of the reactive components of the antenna impedance matching circuit to increase the output voltage of the charge pump.

10. An RFID tag according to claim 9 wherein the second digital control loop is configured to control connection of the reactive components of the antenna impedance matching circuit in response to determining that the charge pump output voltage is less than a threshold voltage.

11. An RFID tag according to claim 1 further comprising a counter that controls the connection of the reactive components of the antenna impedance matching circuit to the antenna.

12. An RFID tag according to claim 1 wherein the first control loop determines a charge pump overflow condition and wherein the indicator indicates the charge pump overflow condition.

13. A method according to claim 7 wherein controlling the antenna impedance matching circuit comprises controlling connection of the reactive components of the antenna impedance matching circuit to match an impedance of the antenna.

14. A method according to claim 7 further comprising:
   incrementing a counter; and
   in response to incrementing the counter, connecting a reactive component of the antenna impedance matching circuit to the antenna.

15. A method according to claim 7 further comprising determining a charge pump overflow condition and wherein controlling the antenna impedance matching circuit comprises connecting a reactive component of the antenna impedance matching circuit to the antenna in response to determining the charge pump overflow condition.

* * * * *